US010525899B2

(12) United States Patent
Mullen et al.

(10) Patent No.: US 10,525,899 B2
(45) Date of Patent: Jan. 7, 2020

(54) DISPLAY SCREEN ASSEMBLY

(71) Applicant: FORD GLOBAL TECHNOLOGIES, LLC, Dearborn, MI (US)

(72) Inventors: Gary D. Mullen, Plymouth, MI (US); Li Lu, Bloomfield Hills, MI (US); Anthony Ligi, Jr., Chelsea, MI (US); Nicholas Andrew Mazzocchi, Ann Arbor, MI (US); Dan Busuioc, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/003,642

(22) Filed: Jun. 8, 2018

(65) Prior Publication Data
US 2019/0375342 A1 Dec. 12, 2019

(51) Int. Cl.
B60R 11/02 (2006.01)
F16F 7/00 (2006.01)
F16F 1/373 (2006.01)
B60R 11/00 (2006.01)

(52) U.S. Cl.
CPC ........ *B60R 11/0235* (2013.01); *F16F 1/3732* (2013.01); *F16F 7/003* (2013.01); *B60R 2011/0015* (2013.01); *B60R 2011/0017* (2013.01); *B60R 2011/0085* (2013.01)

(58) Field of Classification Search
CPC ......... B60R 11/0235; B60R 2011/0015; B60R 2011/0017; B60R 2011/0085; B60R 11/0229; B60R 11/0252; B60R 11/0258; B60R 11/02; B60R 1/0617; B60R 1/076; F16F 1/3732; F16F 7/003; B60K 35/00; B60K 37/02

USPC .................................................. 248/548–549
See application file for complete search history.

(56) References Cited

U.S. PATENT DOCUMENTS

| 4,358,098 A * | 11/1982 | Ceseri .................. F16F 1/3732 267/141.5 |
| 7,878,566 B2 | 2/2011 | Boggess et al. |
| 9,487,157 B1 | 11/2016 | Vinton |
| 9,555,726 B2 | 1/2017 | Jafri et al. |
| 2004/0118987 A1* | 6/2004 | Matko ................. B60R 11/0235 248/282.1 |

(Continued)

FOREIGN PATENT DOCUMENTS

DE 102013016805 A1 4/2015
DE 102016200902 B1 7/2017
(Continued)

OTHER PUBLICATIONS

English Machine Translation of DE102013016805A1.
(Continued)

*Primary Examiner* — Christopher Garft
(74) *Attorney, Agent, or Firm* — Vichit Chea; King & Schickli, PLLC

(57) ABSTRACT

An assembly includes a display screen, a bracket for receiving and holding the display screen, a deformable mounting feature and a frangible mounting feature. The deformable mounting feature is adapted to absorb initial energy in the event of an impact to the display screen. The frangible mounting feature is adapted to further dissipate energy to the extent that the impact energy exceeds the ability of the deformable mounting feature to absorb it.

10 Claims, 4 Drawing Sheets

(56) References Cited

U.S. PATENT DOCUMENTS

| | | | | |
|---|---|---|---|---|
| 2006/0249632 A1* | 11/2006 | McKelvey | ............... | B60R 11/02 |
| | | | | 248/27.1 |
| 2010/0027231 A1* | 2/2010 | Chang | ................... | F16F 1/3732 |
| | | | | 361/807 |
| 2010/0090076 A1* | 4/2010 | Brawner | ............. | B60R 11/0235 |
| | | | | 248/224.8 |
| 2013/0045044 A1* | 2/2013 | Akiyama | ................ | F16B 31/00 |
| | | | | 403/291 |
| 2015/0202999 A1* | 7/2015 | Jafri | ................... | B64D 11/0015 |
| | | | | 297/216.12 |
| 2016/0297376 A1* | 10/2016 | Chen | ................... | B60R 11/0235 |

FOREIGN PATENT DOCUMENTS

| | | |
|---|---|---|
| JP | 2013035424 A | 2/2013 |
| JP | 2013047075 A | 3/2013 |
| WO | 2017085254 A1 | 1/2017 |

OTHER PUBLICATIONS

English Machine Translation of DE102016200902B1.
English Machine Translation of JP2013035424A.
English Machine Translation of JP2013047075A.
English Machine Translation of WO2017085254A1.

\* cited by examiner

DISPLAY SCREEN ASSEMBLY

TECHNICAL FIELD

This document relates generally to the motor vehicle equipment field and, more particularly, to a new and improved display screen assembly wherein the display screen is secured by a mounting bracket with a deformable mounting feature to initially absorb energy in the event of an impact event and a frangible mounting feature to further dissipate that energy when that energy exceeds the ability of the deformable mounting feature to absorb energy.

BACKGROUND

As motor vehicles evolve, it is proposed to utilize display screens for displaying information at new positions not previously considered for this purpose. For example, a display screen may now be provided protruding from the center stack of the instrument panel. In other vehicles such as autonomous vehicles, display screens may be mounted in headrests or along the seat back, mounted to headliners or even to pillars such as the B and C pillars between rows of seating.

Many of these new display screen positions mean that the display screens could potentially be impacted by an occupant in the event of a sudden impact such as due to a collision. Accordingly, it is more important than ever to ensure that the display screen assembly has the necessary features to dissipate energy due to human impact and thereby improve safety.

This document relates to a new and improved assembly for a display screen incorporating both a deformable mounting feature to initially absorb energy in the event of an impact and a cooperating frangible mounting feature to further dissipate energy in the event the impact energy exceeds the capability of the deformable mounting feature to absorb the energy.

SUMMARY

In accordance with the purposes and benefits as described herein, a new and improved assembly is provided. That assembly comprises a display screen, a bracket receiving and holding that display screen, a deformable mounting feature to absorb energy in the event of an impact to the display screen and a frangible mounting feature to further dissipate energy from the impact when that energy exceeds the capability of the deformable mounting feature to absorb that energy.

More specifically, the assembly may include at least one display screen mounting point on the bracket. Further, the deformable mounting feature may include at least one compression joint. In other embodiments, the deformable mounting feature may include a first compression joint and a second compression joint.

The frangible mounting feature may include a first breakaway joint and a second breakaway joint. In some of the many possible embodiments of the assembly, the first compression joint and the second compression joint are provided inboard of the first breakaway joint and the second breakaway joint.

The bracket may include a body having a first end, a second end and an intermediate section between the first end and the second end. Further, the bracket may include a first mounting tab and a second mounting tab projecting from the intermediate section.

The first compression joint may be provided at the first mounting tab. The second compression joint may be provided at the second mounting tab. The first breakaway joint may be provided at the first end of the bracket. The second breakaway joint may be provided at the second end of the bracket.

The intermediate section of the bracket may include a first segment, a second segment, a third segment, a fourth segment and a fifth segment. The intermediate section may further include a first bend connecting the first segment to the second segment, a second bend, connecting the second segment to the third segment, a third bend, connecting the third segment to the fourth segment and a fourth bend, connecting the fourth segment to the fifth segment. Still further, the first segment may be connected to the first end by a fifth bend. The fifth segment may be connected to the second end by a sixth bend.

In one or more of the many possible embodiments of the assembly, the display screen mounting point may include three attachment points provided, for example, at the first end, the second end and the third segment of the bracket. In addition, the first mounting tab may depend from the second segment. The second mounting tab may depend from the fourth segment.

The assembly may further include a first fastener at the first compression joint, a second fastener at the second compression joint, a first frangible fastener at the first breakaway joint and a second frangible fastener at the second breakaway joint.

Still further, the assembly may include a first rubber grommet at the first compression joint and a second rubber grommet at the second compression joint. In one or more of the many possible embodiments of the assembly, the first fastener may include a first bolt and a first cooperating cap washer. The first mounting tab, the first grommet and a support substrate maybe sandwiched between the first bolt and the first cooperating cap washer. Further, the first rubber grommet may include a first receiver receiving the support substrate. That first receiver may be provided in the first grommet toward a bracket end of the first grommet. In such an embodiment, the first cap washer may include a first channel receiving a cap washer end of the first grommet.

In the following description, there are shown and described several preferred embodiments of the assembly. As it should be realized, the assembly is capable of other, different embodiments and its several details are capable of modification in various, obvious aspects all without departing from the assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the assembly together with the description serve to explain certain principles thereof. In the drawing figures.

Reference will now be made in detail to the present preferred embodiments of the support and the armrest assembly, examples of which are illustrated in the accompanying drawing figures.

DETAILED DESCRIPTION

Figure 1:
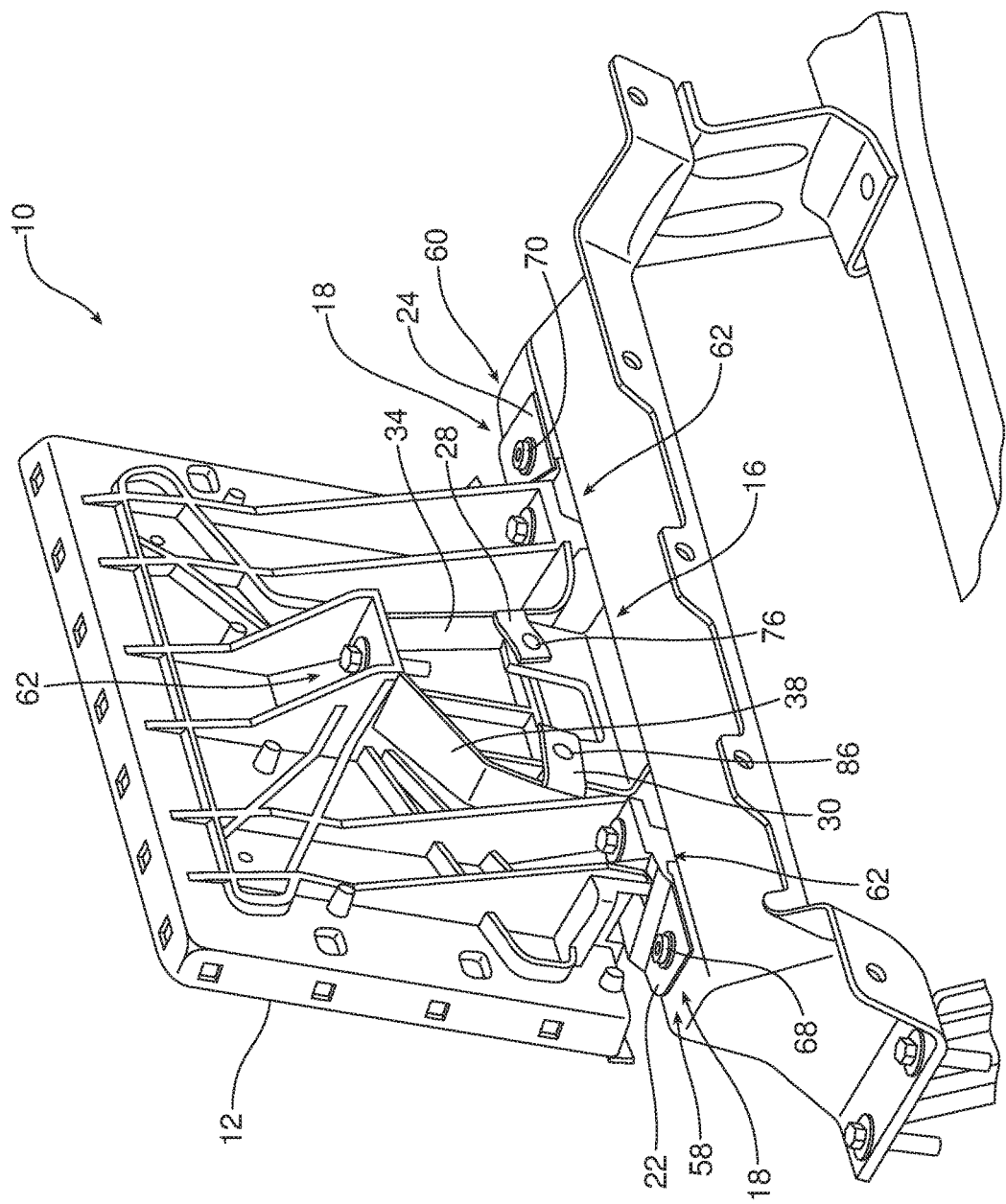
FIG. 1 is a rear perspective view of the assembly showing how the display screen is held in a bracket mounted by means of a deformable mounting feature and a frangible mounting feature to a support substrate or beam of a motor vehicle.
Figure 2:
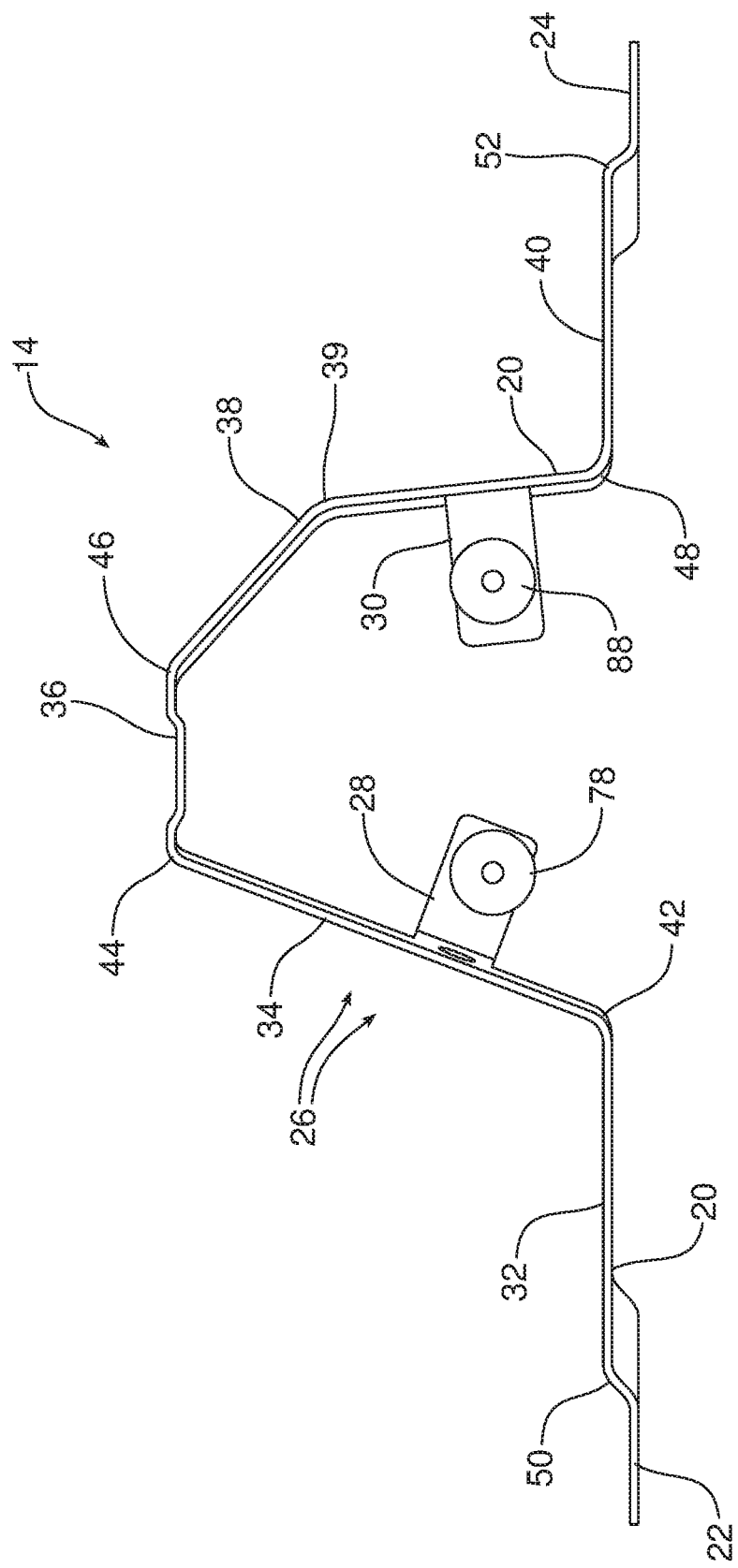
FIG. 2 is a detailed edge-on view of the bracket, illustrated in FIG. 1 that receives and holds the display screen.

Reference is now made to FIGS. 1 and 2 showing the new and improved assembly 10. That assembly 10 includes a display screen 12, a bracket 14, adapted or configured to receive and hold the display screen, a deformable mounting feature, generally designated by reference numeral 16, and a frangible mounting feature, generally designated by reference numeral 18. The deformable mounting feature 16 is adapted to initially absorb energy in the event of an impact to the display screen such as might occur during an accident of a motor vehicle equipped with the assembly. The frangible mounting feature 18 is adapted or configured to further dissipate injury from that impact should the impact energy exceed that which may be absorbed by the deformable mounting feature 16.

Reference is now made to FIG. 2 illustrating the bracket 14 in detail. As illustrated, the bracket 14 includes a body 20 having a first end 22, a second end 24, and an intermediate section 26 extending between the first end and the second end. The bracket 14 further includes a first mounting tab 28 and a second mounting tab 30 projecting from the intermediate section 26.

More specifically, the intermediate section 26 includes a first segment 32, a second segment 34, a third segment 36, a fourth segment 38 and a fifth segment 40. A first bend 42 connects the first segment 32 to the second segment 34. A second bend 44 connects the second segment 34 to the third segment 36. A third bend 46 connects the third segment 36 to the fourth segment 38 (note segment 38 includes a kink 39). A fourth bend 48 connects the fourth segment 38 to the fifth segment 40. A fifth bend 50 connects the first segment 32 to the first end 22. A sixth bend 52 connects the fifth segment 40 to the second end 24. The first mounting tab 28 in the illustrated embodiment depends from the second segment 34. The second mounting tab 30 depends from the fourth segment 38.

Figure 3:
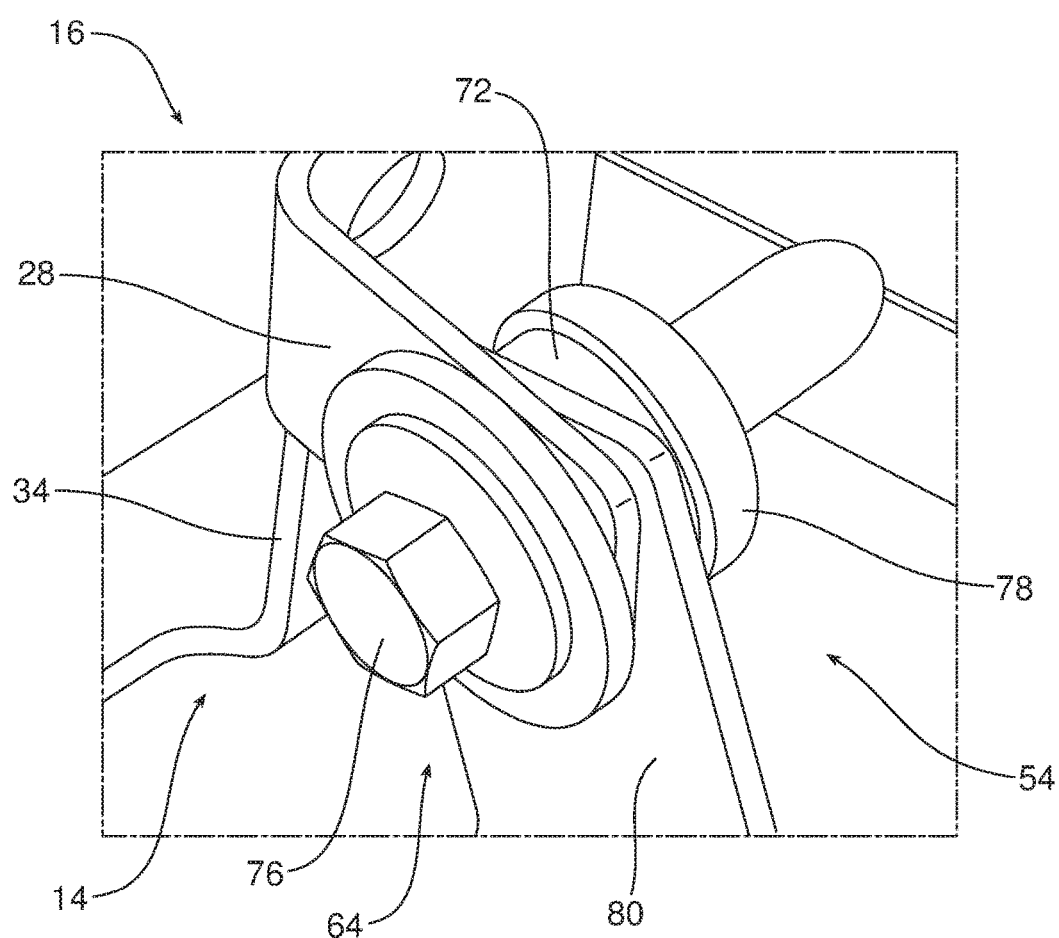
FIG. 3 is a detailed perspective view of a first compression joint of the deformable mounting feature.
Figure 4:
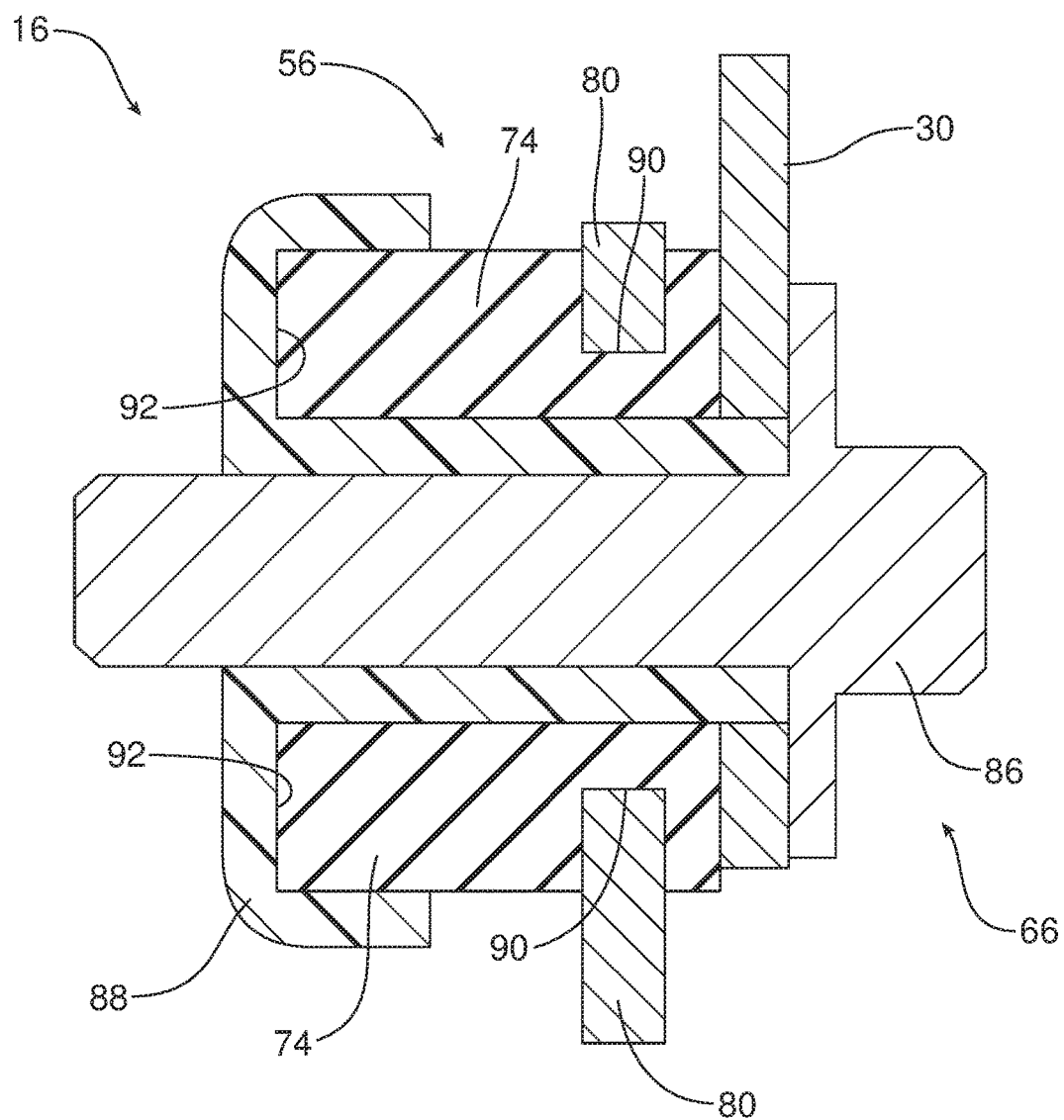
FIG. 4 is a detailed cross-sectional view of the second compression joint of the deformable mounting feature.

As illustrated in FIGS. 1, 3 and 4, the deformable mounting feature 16 of the illustrated embodiment includes at least one compression joint and, more particularly, a first compression joint, generally designated by reference numeral 54, and a second compression joint, generally designated by reference numeral 56. The frangible mounting feature 18 of the illustrated embodiment includes a first breakaway joint 58 and a second breakaway joint 60. In the illustrated embodiment, the first compression joint 54 and the second compression joint 56 are provided inboard of the first breakaway joint 58 and the second breakaway joint 60. More particularly, the first breakaway joint 58 is provided at the first end 22 of the bracket 14 while the second breakaway joint 60 is provided at the second end 24 of that bracket. The first compression joint 54 is provided at the first mounting tab 28 while the second compression joint 56 is provided at the second mounting tab 30.

In the illustrated embodiment at least one display screen mounting point is provided on the bracket 14. More particularly, in the illustrated embodiment a display screen mounting point 62 is provided at the first end 22, the second end 24 and the third segment 36 of the bracket 14.

More specifically, a first fastener 64 is provided at the first compression joint 54. A second fastener 66 is provided at the second compression joint 56. A first frangible fastener 68 is provided at the first breakaway joint 58 and a second frangible fastener 70 is provided at the second breakaway joint 60. Each of the frangible fasteners 68, 70 is engineered to break when subjected to a particular impact force wherein that particular impact force exceeds the impact force capable of being dissipated by the compression joints 54, 56 of the deformable mounting feature 16.

Still further, the assembly 10 includes a first rubber grommet 72 at the first compression joint 54 and a second rubber grommet 74 at the second compression joint 56. The first fastener 64 also includes a first bolt 76 and a first operating cap washer 78. The first mounting tab 28, the first rubber grommet 72 and a part of the support substrate 80 to which the assembly 10 is mounted, are sandwiched between the first bolt 76 and the first cooperating cap washer 78. Toward this end, the first rubber grommet 72 includes a first receiver (hidden from view in FIG. 3) that receives and holds the support substrate 80. That first receiver is provided in the first rubber grommet 72 toward a bracket end of the first rubber grommet. The first cap washer 78 includes a first channel (also hidden from view) for receiving the cap washer end of the first rubber grommet 72.

Similarly, as illustrated in FIG. 4, the second fastener 66 includes a second bolt 86 and a second cap washer 88. The second mounting tab 30, the second rubber grommet 74 and the support substrate 80 are sandwiched between the second bolt 86 and the second cap washer 88.

That second rubber grommet 74 includes a second receiver 90 to receive and hold the support substrate 80. That second receiver 90 is provided in the second rubber grommet 74 toward a bracket end of the second rubber grommet. The second cap washer 88 includes a second channel 92 that receives a cap washer end of the second rubber grommet 74. The first receiver and first channel that are hidden from view in FIG. 3 correspond in structure to the second receiver 90 and second channel 92 illustrated in FIG. 4.

As should be appreciated, the first and second rubber grommets 72, 74 of the first and second compression joints 54, 56 provide a damping action that dissipates any impact force initially applied to the display screen 12 thereby absorbing impact energy. The depth of the first and second channels 92 of the respective first and second cap washers 78, 88 may be engineered to provide tuning for compression rate and dissipation of impact force. Significantly, as best illustrated in FIG. 4, the support substrate 80 is received in the second receiver 90 in the second rubber grommet 74 that is closer to the second mounting tab 30 of the bracket 14 than the channel end of the second cap washer 88. Here it should be appreciated that the short side of the second rubber grommet 74 between the bracket 14 and the fixed support substrate 80 compresses minimally when the display screen 12 is pulled rearward while the long side 98 of the second rubber grommet 74 compresses substantially more when the display screen 12 is impacted by a motor vehicle occupant during a collision event. Here it should be appreciated that the first compression joint 54 including the first rubber grommet 72 has the same configuration as the second compression joint 56 and the second rubber grommet 74 in order to function in the same manner.

The foregoing has been presented for purposes of illustration and description. It is not intended to be exhaustive or to limit the embodiments to the precise form disclosed.

Obvious modifications and variations are possible in light of the above teachings. All such modifications and variations are within the scope of the appended claims when interpreted in accordance with the breadth to which they are fairly, legally and equitably entitled.

What is claimed:

1. An assembly, comprising:
   a support substrate;
   a display screen;
   a bracket receiving and holding said display screen wherein said bracket includes at least one display screen mounting point, a body having a first end, a second end and an intermediate section between said first end and said second end, a first mounting tab and a second mounting tab projecting from said intermediate section and wherein said intermediate section includes a first segment, a second segment, a third segment, a fourth segment and a fifth segment, a first bend connecting said first segment to said second segment, a second bend connecting said second segment to said third segment, a third bend connecting said third segment to said fourth segment, and a fourth bend connecting said fourth segment to said fifth segment;
   a deformable mounting feature to absorb energy in event of an impact to said display screen, said deformable mounting feature including a first compression joint and a second compression joint joining said bracket and said support substrate wherein said first compression joint is provided at said first mounting tab and said second compression joint is provided at said second mounting tab; and
   a frangible mounting feature, independent from said deformable mounting feature, to further dissipate energy from said impact, said frangible mounting feature including a first breakaway joint and a second breakaway joint wherein said first breakaway joint is provided at said first end and said second breakaway joint is provided at said second end and wherein said first compression joint and said second compression joint are inboard said first breakaway joint and said second breakaway joint.

2. The assembly of claim 1, wherein said first segment is connected to said first end by a fifth bend and said fifth segment is connected to said second end by a sixth bend.

3. The assembly of claim 2, wherein a first of said at least one display screen mounting point is provided at said first end, a second of said at least one display screen mounting point is provided at said second end and a third of said at least one display screen mounting point is provided at said third segment of said bracket.

4. The assembly of claim 3, wherein said first mounting tab depends from said second segment and said second mounting tab depends from said fourth segment.

5. The assembly of claim 4, further including a first fastener at said first compression joint, a second fastener at said second compression joint, a first frangible fastener at said first breakaway joint and a second frangible fastener at said second breakaway joint.

6. The assembly of claim 5, further including a first rubber grommet at said first compression joint and a second rubber grommet at said second compression joint.

7. The assembly of claim 6, wherein said first fastener includes a first bolt and a first cap washer, said first mounting tab, said first rubber grommet and a support substrate being sandwiched between said first bolt and said first cap washer.

8. The assembly of claim 7, wherein said first rubber grommet includes a first receiver receiving said support substrate.

9. The assembly of claim 8, wherein said first receiver is provided in said first rubber grommet toward a bracket end of said first rubber grommet.

10. The assembly of claim 9, wherein said first cap washer includes a first channel receiving a cap washer end of said first rubber grommet.

\* \* \* \* \*